United States Patent [19]

Tanaka

[11] Patent Number: 4,915,961
[45] Date of Patent: * Apr. 10, 1990

[54] VACUUM-PACKED FOOD CONTAINING DUNALIELLA ALGAE AND PROCESS FOR THE PRODUCTION THEREOF

[76] Inventor: Yoshio Tanaka, 22 Banchi, Yamaguchi-cho, Gifu-shi, Gifu-ken, Japan

[*] Notice: The portion of the term of this patent subsequent to Apr. 3, 2007 has been disclaimed.

[21] Appl. No.: 225,424

[22] Filed: Jul. 28, 1988

[30] Foreign Application Priority Data

Feb. 25, 1988 [JP] Japan ................................ 63-40753

[51] Int. Cl.$^4$ .................... B65B 31/02; A23L 1/03
[52] U.S. Cl. ...................................... 426/72; 426/106; 426/410; 426/541; 426/658; 426/639; 426/640
[58] Field of Search ................. 426/72, 106, 410, 415, 426/541, 658, 639, 640

[56] References Cited

U.S. PATENT DOCUMENTS 4,143,162  3/1979  Tanaka ................................. 426/89
4,576,283  3/1986  Fafournoux ...................... 206/524.8
4,775,749  10/1988  Hijiya et al. ........................ 536/103

FOREIGN PATENT DOCUMENTS 56-113269  9/1981  Japan .
58-190377  11/1983  Japan .

OTHER PUBLICATIONS

*Lipid Composition of the Halotolerant Alga, Dunaliella Bardawil,* Fried et at, Biochimica et Biophysica Acta, 713(1982), pp. 419–426.

*Glycerol and B-caroten metabolism in the halotolerant alga Dunaliella: a model system for biosolar energy conversion,* Ben–Amotz & Avron, TIBS, Nov. 1981, pp. 297–299.

*Accumulation of B–Carotene in Halotolerant Algae Purification and Characterization of B–Caroten–Rich Globules from Dunaliella Bardawil (Chlorophyceae).* Ben–Amotz & Avron, J. Phycol. 18, 1982, pp. 529–537.

*Glycerol, B–carotene and Dry Algal Meal Production by Commerical Cultivation of Dunaliella,* Ben–Amotz & Avron, Algae Biomass, 1980, pp. 603–610.

Finney K. F. et al., "Use of Algae Dunaliella as a protein supplement in bread", Cereal Chem. 61(5), pp. 402–406.

*Primary Examiner*—Marianne Cintins
*Assistant Examiner*—Evan Federman
*Attorney, Agent, or Firm*—Browdy and Neimark

[57] ABSTRACT

A new type of health food containing dried powder of Dunaliella algae is produced by means of vacuum-packing granulated materials including dried powder of said algae with use of plastic film which is both lighttight and gastight. The vacuum-packed food is very rich in β-carotene.

4 Claims, No Drawings

VACUUM-PACKED FOOD CONTAINING DUNALIELLA ALGAE AND PROCESS FOR THE PRODUCTION THEREOF

FIELD OF THE INVENTION

The present invention relatesto vacuum-packed food containing Dunaliella algae and a process for the production thereof. More particularly, the present invention relates to vacuum-packed food obtained by utilizing various kinds of active ingredients included in Dunaliella algae, especially large quantities of β-carotene present in the algae without degrading it, as well as to a process for producing such food.

BACKGROUND OF THE INVENTION

It has been well known that Chlorella algae, which belong to the species of unicellular Chlorophyceae, are used for the purposes of preparing food or food additives in a form of the algae per se or the extracted solution thereof. It has also been known that β-carotene, which is found in large quantities in Dunaliella algae belonging to the same species as Chlorella algae, is utilized in the form of a suspension in vegetable oil as natural coloring agents for food, cosmetics, feed and the like or as a nourishing substance. However, no practical proposal had been made concerning the method of utilizing Dunaliella algae per se for health-oriented food without destroying the β-carotene occurring therein.

Dunaliella algae contain proteins, sugars, lipids, iron, vitamins and a variety of other physiologically active ingredients. As to vitamins, Dunaliella algae produce a lot of β-carotene therein by growing the algae in a culture fluid containing a high concentration of salt and a small amount of nitrogen under intense light from sunbeams and other appropriate conditions. β-carotene is a provitamin A compound having conjugated double bands. Accordingly, β-carotene is oxygen-, heat-, and light-labile. This presents a serious problem in the manufacture of health food containing Dunaliella algae. It has therefore been strongly desired to develop a method by which the algae can be processed without destroying natural β-carotene and the product obtained preserved in a stable state.

The present inventor actively investigated possible solutions for the aforementioned problems. As the result of such investigation, he has completed the present invention.

SUMMARY OF THE INVENTION

As object of the present invention is to provide vacuum-packed food containing Dunaliella algae comprising 50-300 parts by weight of granulated materials consisting of 10-240 parts by weight of dried powder of the algae is vacuum-packed with an oxygen-impermeable and light-impermeable plastic packing film.

Another object of the present invention is to provide a process for the production of vacuum-packed food containing Dunaliella algae which comprises the following steps: adding cyclodextrin to dried powder of the algae, stirring and blending them, thereby obtaining a mixture; adding to 100 parts by weight of the mixture 0.10~0.25 parts by weight of an antioxidant and 35.50~40.60 parts by weight of a binder, thereby forming a binder-cotaining mixture, granulating the resultant mixture, thereby obtaining granules; vacuum-packing the granules with a package made of plastic film which is impermeable by both light and oxygen. The ratio of the dried algae powder to the granules of the vacuum-packed product is 10-240:300, by weight.

DETAILED DESCRIPTION OF THE PREFERRED EMBODIMENTS OF THE INVENTION

The dried powder of Dunaliella algae used as a starting material in the present invention means such powder as is obtained by the process comprising the steps of:
(1) preliminarily removing about 50% by weight of water gradually from the culture fluid of Dunaliella algae by a dehydrator such as a centrifuge so as to make it easier to dry the fluid;
(2) adding to the dehydrated culture fluid an appropriate amount of each of an anti-caking agent, preferably dextrin, an antioxidant, preferably vitamin E, and other suitable additives; and
(3) spray-drying, vacuum-drying or freeze-drying the mixture thus prepared. Dunaliella algae are morphologically characterized by the inexistence of a hard cell wall composed of polysaccharides although the algae have thin cell membrane, whereas the other green algae, such as Chlorella algae, have both the cell wall and the cell membrane. It is also characteristic of Dunaliella algae that they contain a large quantity of β-carotene. Typical examples of Dunaliella employed in the present invention include *Dunaliella bardawil* and *Dunaliella salina.*

In accordance with the present invention, the mixing ratio of cyclodextrin to dried Dunaliella algae is, by weight, 15-50:100. The vacuum-packed food contains 10-240 parts by weight of the dried algae powder per 300 parts by weight of vacuum-packed food. The ratio of each of other additive materials per 100 parts by weight of the mixture mentioned about is as follows:
a lubricant—3.50 parts by weight
an antioxidant—0.10~0.25 by weight
a binder—35.50~40.60 by weight When one package contains 300 parts by weight of the food composed of Dunaliella algae as prepared above, the maximum content of dried powder of Dunaliella algae in the product is 80% of the total food weight per package. From the viewpoint of health, it is desirable to eat two to four packages of this food a day. Above, all, if the product contains a large amount of β-carotene, its full usefulness can be secured.

Vitamins C and E are illustrative of suitable antioxidants which are used in the present invention. Among suitable binders are sugars, preferably reducing maltose. Lubricants employed in the present invention are talc and ester of sucrose and fatty acid; the latter is more advantageous than the former. Examples of cyclodextrins (the term cyclodextrin is hereinafter referred to as "CD".) include α-CD, β-CD, γ-CD, δ-CD, ε-CD, polymer-CD and CD sugar. With respect to package film, there is no suitable one that is made of a single material and that is impermeable by both light and oxygen. Therefore, it is favorable to make use of opaque laminated plastic film obtained by uniting a plastic film and any one or more materials selected from the group consisting of aluminum foil, paper, cellophane and another plastic film.

EXAMPLE

To 100 parts by weight of dried powder of Dunaliella algae was added 25 parts by weight of CD. These materials were mixed in a V-model mixer for about 5 minutes to obtain a mixture. To 100 parts by weight of the mixture were added 0.2 parts by weight of vitamin E (antioxidant) and 37 parts by weight of powdered thick malt syrup containing reducing maltose (binder). The resulting mixture was granulated in the form of fine particles by a roller converter. Granulated particles thus prepared were packed by a vacuum-packing machine in plastic film coated by aluminum foil to obtain expected vacuum-packed products.

It was confirmed that the content of dried powder of Dunaliella algae was 59% of the total weight of vacuum-packed food thus obtained.

The present invention has made it practicable to obtain vacuum-packed healthy food containing active ingredients of Dunaliella algae without destroying $\beta$-carotene in dried powder of the algae or gradually diminishing the $\beta$-carotene content. In other words, the present invention has produced remarkably good results of utilizing naturally occurring $\beta$-carotene with keeping its activity and such results were never attained by prior art.

What is claimed is:

1. A food product comprising Dunaliella algae, cyclodextrin, an antioxidant selected from the group consisting of vitamin C and vitamin E, and a binder selected from the group consisting of sugars, wherein the ratio of cyclodextrin to said dried powder is from 15 to 50:100, the ratio of antioxidant to said binder to said mixture of said powder and cyclodextrin is 0.10-0.25:35.50-40.60:100, and the ratio of said powder to said food is 10-240:300.

2. The food product according to claim 1 wherein the food product is packaged in a container made of coated or laminated plastic film which is opaque and oxygen impermeable.

3. A process for the production of a food product containing Dunaliella algae comprising:
adding from 15 to 50 parts by weight of cyclodextrin to 100 parts by weight of dried powder of Dunaliella algae;
stirring and blending the dried powder and cyclodextrin to obtain a mixture;
adding to 100 parts by weight of said mixture from 0.10 to 0.25 parts by weight of an antioxidant selected from the group consisting of vitamin C and vitamin E, and from 35.50 to 40.60 parts by weight of a binder to form a binder-containing mixture;
granulating the binder-containing mixture to obtain granules;
and vacuum-packing said granules in a package made of oxygen-impermeable, opaque plastic film.

4. The process according to claim 3 wherein said granules are packed in an amount of 300 mg of granules per package.

* * * * *